United States Patent
Sleichter

[11] 3,782,754
[45] Jan. 1, 1974

[54] VEHICLE OVERLOAD SPRING APPARATUS

[76] Inventor: Kenneth W. Sleichter, 1108 E. 17th St., Ottawa, Kans. 66067

[22] Filed: Mar. 9, 1972

[21] Appl. No.: 229,209

[52] U.S. Cl. .............................. 280/124 R, 267/54
[51] Int. Cl. ............................................. B60g 11/02
[58] Field of Search ................... 280/124 R; 267/54, 267/55, 56, 38

[56] References Cited
UNITED STATES PATENTS
2,264,174  11/1941  Crump .......................... 280/124 R
2,468,387  4/1949  Wiley ............................ 280/124 R Primary Examiner—Philip Goodman
Attorney—Claude A. Fishburn et al.

[57] ABSTRACT

A vehicle overload spring apparatus for a vehicle having the usual spring is provided. An overload spring is mounted to the vehicle unsprung member. A first first support means and second first support means are provided for mounting to the vehicle frame adjacent opposite ends of the overload spring for selectively and individually or simultaneously engaging or not engaging the overload spring. Or, a first second support means and second second support means are provided for mounting to the vehicle frame adjacent opposite ends of the overload spring for selectively and individually or simultaneously engaging or not engaging the overload spring. Or, further, a first first support means and first second support means are provided for mounting to the vehicle frame adjacent opposite ends of the overload spring for selectively and individually or simultaneously engaging or not engaging the overload spring. The first support means has a bracket means mounted to the vehicle frame. A first support is pivotally and laterally slidably mounted to the bracket means for engaging the overload spring when in the spring engaging down position. A first stop, second stop, first holding member, and retaining hook are provided for snugly holding the first support in the spring engaging down or up position. The second support means has a second rod mounted to the frame. A second support is pivotally and laterally slidably mounted on the rod for engaging the overload spring when in the spring engaging down position. A biasing means is provided for urging the second support against the frame. A third stop, fourth stop, and second holding member are mounted to the frame for holding the second support means in the spring engaging down or up position.

9 Claims, 7 Drawing Figures

VEHICLE OVERLOAD SPRING APPARATUS

SUMMARY OF THE INVENTION

A vehicle overload spring apparatus for a vehicle having the usual spring is provided. An overload spring is mounted to the vehicle unsprung member. A first first support means and second first support means are provided for mounting to the vehicle frame adjacent opposite ends of the overload spring for selectively and individually or simultaneously engaging or not engaging the overload spring. Or, a first second support means and second second support means are provided for mounting to the vehicle frame adjacent opposite ends of the overload spring for selectively and individually or simultaneously engaging or not engaging the overload spring. Or, further, a first first support means and first second support means are provided for mounting to the vehicle frame adjacent opposite ends of the overload spring for selectively and individually or simultaneously engaging or not engaging the overload spring. The first support means has a bracket means mounted to the vehicle frame. A first support is pivotally and laterally slidably mounted to the bracket means for engaging the overload spring when in the spring engaging down position. A first stop and second stop are mounted to the frame for snugly preventing forward or rearward movement of the first support when the first support is in the spring engaging down position. A first holding member is mounted to the frame for holding the first support in the up position. A retaining member is pivotally mounted to the bracket means adjacent the first support for holding the first support snugly in the spring engaging down position or up position. The second support means has a second rod mounted to the vehicle frame. A second support is pivotally and laterally slidably mounted to the second rod for engaging the overload spring when in the spring engaging down position. A biasing means is provided for urging the second support against the vehicle frame. A clamp is mounted to the bottom of the second support for clamping the second support to the overload spring when the second support is in the spring engaging down position. A third stop and fourth stop are mounted to the frame for snugly preventing forward or rearward movement of the second support when the second support is in the spring engaging down position. A second holding member is mounted to the vehicle frame for holding the second support in the up position.

A very important object of this invention is to provide a vehicle overload spring apparatus in which the pivot means and retaining means for the supports have much more strength than has been previously available with apparatus of this type.

A further important object of this invention is to provide a novel vehicle overload spring apparatus wherein the strength enhancement acheived by the provision of integral retaining structure secured to the frame does not prevent ready and facile pivoting of the supports to and from their overload spring engaging down position and up position.

A further object of this invention is to provide a vehicle overload apring apparatus that will allow an overload spring to be selectively operatively engaged or not engaged as desired.

A further object of this invention is to provide a vehicle overload spring apparatus that will allow one or both ends of the overload spring to help with the vehicle load, thus providing an overload spring having a two-stage phase in capability.

A further object of this invention is to provide a vehicle overload spring apparatus that will give an easier, less bumpy ride to the vehicle.

A further object of this invention is to provide a vehicle overload spring apparatus that can be used on either cars or trucks.

A further object of this invention is to provide a vehicle overload spring apparatus that is east, fast and simple to operate.

A further object of this invention is to provide a vehicle overload spring apparatus that will not rattle and is noiseless.

A further object of this invention is to provide a vehicle overload spring apparatus that will increase the load carrying capacity of the vehicle.

A further object of this invention is to provide a vehicle overload spring apparatus that positively clamps the second support means to the overload spring, thus eliminating noise and rattle on a bumpy road.

DESCRIPTION OF THE PREFERRED EMBODIMENT

Figure 1:
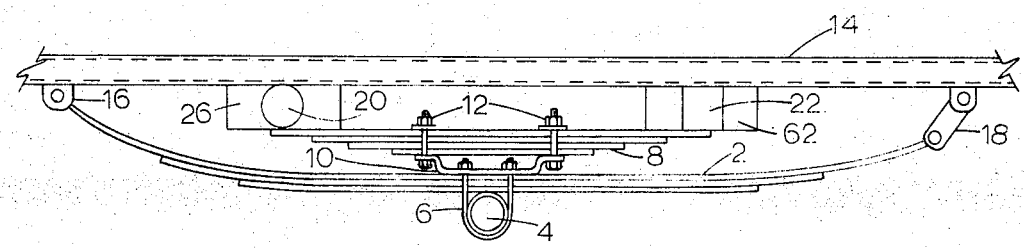
FIG. 1 is a side elevation view of the vehicle overload spring apparatus with a first first support means shown as a circle and a first second support means shown as a square.

Referring more in detail to the drawings, a usual spring 2 is shown attached to a vehicle axle member 4 by U-bolt 6. An overload spring 8 is shown mounted to the usual spring 2 by a bracket 10 and bolts 12. The usual spring 2 is pivotally connected to the vehicle frame member 14 at 16 and 18. A first support means 20 is shown as a circle. A second support means 22 is shown as a square. Now it can be seen that when the first support means 20 and second support means 22 are rigidly engaging frame member 14 and overload spring 8 additional overload spring 8 support is given to the frame member 14.

Figure 4:
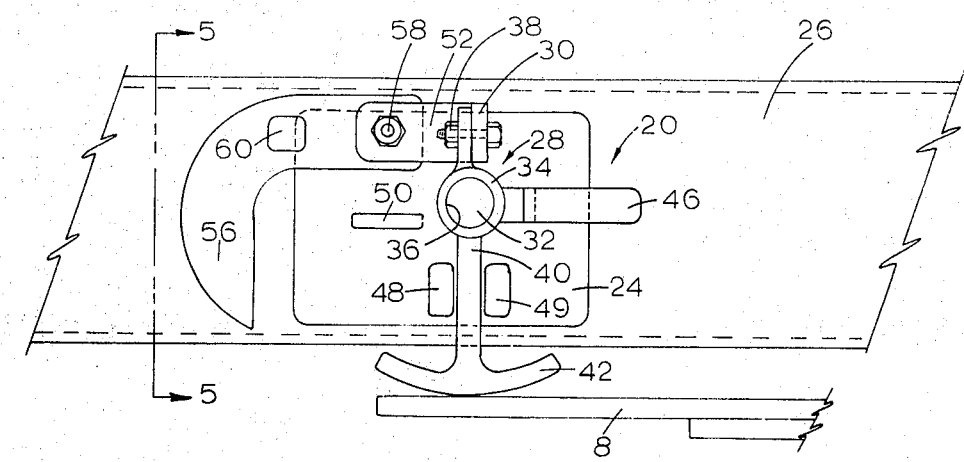
FIG. 4 is a side elevation view of the first support means in the spring engaging down position.
Figure 5:
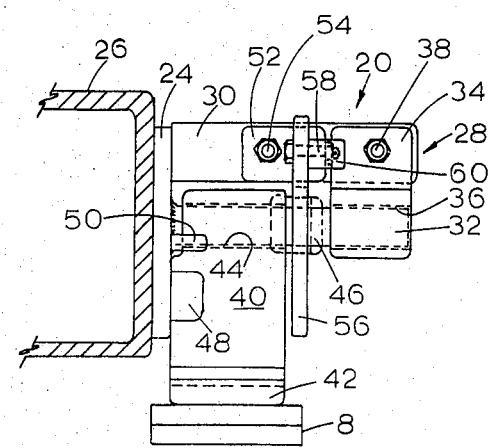
FIG. 5 is a sectional view taken along line 5—5 of FIG. 4.

Referring more in detail to FIG. 4 and FIG. 5 the first support means 20 is shown more in detail. A first plate 24 is mounted as by welding to frame lower member 26. A bracket means 28 is provided. The bracket means 28 has a bracket member 30 welded to first plate 24. A first rod 32 is mounted to the first plate 24 as by welding, below the bracket member 30. A connecting member 34 having a connecting member hole 36 is mounted to the end of the bracket member 30 by means of bolt 38 with the first rod 32 fitted in the connecting member hole 36. A first support 40 of the character of a compression member, having a first support foot 42 and a first support hole 44 is pivotally mounted on first rod 32 with the first support hole 44 on the first rod 32. A first handle 46 is welded to the first support 40 for rotating the first support 40 and for moving the first support 40 laterally on first rod 32. A first stop 48 and second stop 49 are mounted to the first plate 24 snugly adjacent and on opposite sides of the first support 40 for preventing forward or rearward movement of the first support 40 when the first support 40 is in the spring engaging down position. A first holding member 50 is mounted as by welding to the first plate 24. A L-bracket 52 is mounted by a bolt 54 to the bracket member 30. A retaining hook 56 is pivotally mounted by a bolt 58 to the L-bracket 52. The retaining hook 56 has a hook handle 60.

To interpose the first support 40 between the frame lower member 26 and the overload spring 8 the retaining hook 56 is raised and the first support 40 is lowered and moved laterally between the first stop 48 and second stop 49 against the first plate 24. Then, the retaining hook 56 is lowered to snugly maintain the first support 40 in the spring engaging down position. To move the first support 40 to the up position the retaining hook 56 is raised, the first support 40 is laterally slid outwardly, the first support 40 is raised upwardly, the first support 40 is slid inwardly against the first plate 24 above the first holding member 50. The retaining hook 56 is then moved downwardly to securely and snugly maintain the first support 40 in the up position.

Figure 6:
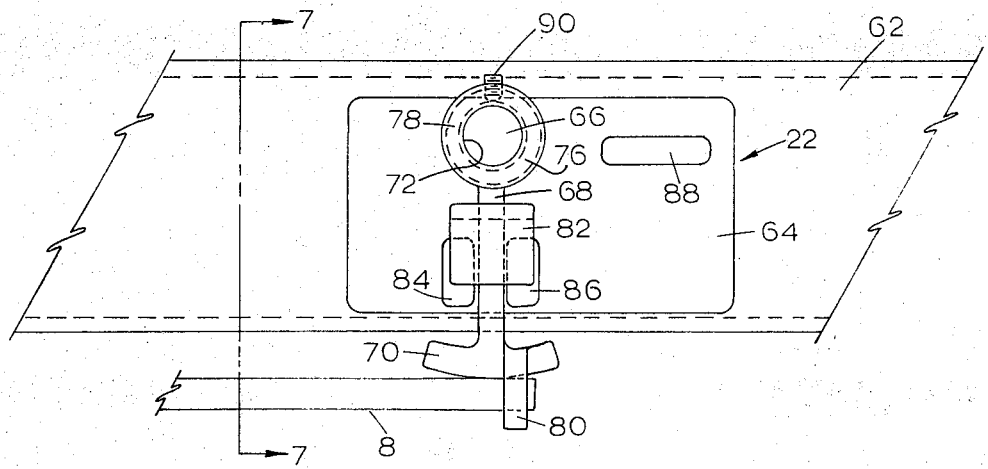
FIG. 6 is a side elevation view of the second support means in the spring engaging down position.
Figure 7:
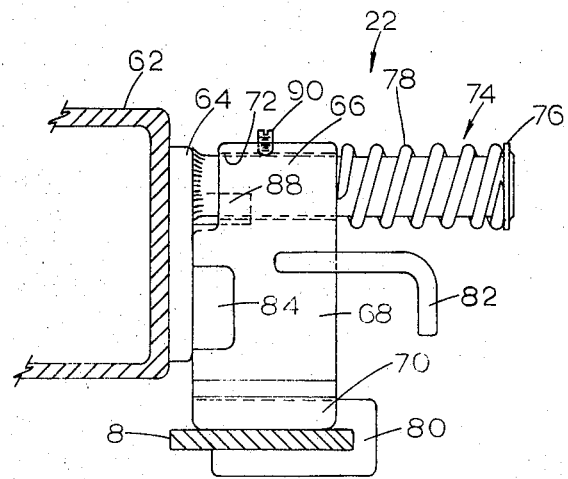
FIG. 7. is a sectional view taken along line 7—7 of FIG. 6.

Referring more in detail to FIG. 6 and FIG. 7 the second support means 22 will be described in detail. A second frame lower member 62 is mounted to the vehicle frame member 14. A second plate 64 is mounted as by welding to second frame lower member 62. A second rod 66 is mounted to second plate 64 as by welding. A second support 68 of the character of a compression member, having a second support foot 70 and a second support hole 72 is pivotally and slidably mounted on the second rod 66 with the second support hole 72 on the second rod 66. A biasing means 74 is provided for urging the second support 68 against the second plate 64. The biasing means 74 has a retaining ring 76 mounted to the end of the second rod 66. A biasing spring 78 is mounted on the second rod 66 between the second support 68 and the retaining ring 76 for urging and pushing the second support 68 against the second plate 64. A clamp 80 is mounted on the second support foot 70 for clamping the second support 68 to the overload spring 8 when the second support 68 is in the spring engaging down position. A second handle 82 is mounted to the second support 68 for manipulating the second support 68. A third stop 84 and a fourth stop 86 are mounted to the second plate 64 snugly adjacent and on opposite sides of the second support 68. A set screw 90 is threaded into the top of second support 68 and, if desired, can be tightened against the second rod 66 to help hold the second support 68 as desired. A second holding member 88 is mounted to the second plate 64 for holding the second support 68 in the up position. To clamp the second support 68 in the spring engaging down position the second handle 82 is pulled to move the second support 68 outwardly. The second support 68 is then aligned between the third stop 84 and fourth stop 86 and the second handle 82 released to allow the biasing spring 78 to urge the second support 68 between the third stop 84 and fourth stop 86 and against the second plate 64. To move the second support 68 to the up position the second support 68 is moved outwardly by pulling the second handle 82. The second support 68 is then raised above the second holding member 88 and the second handle 82 is released to allow the biasing spring 78 to urge the second support 68 against the second plate 64.

Figure 2:
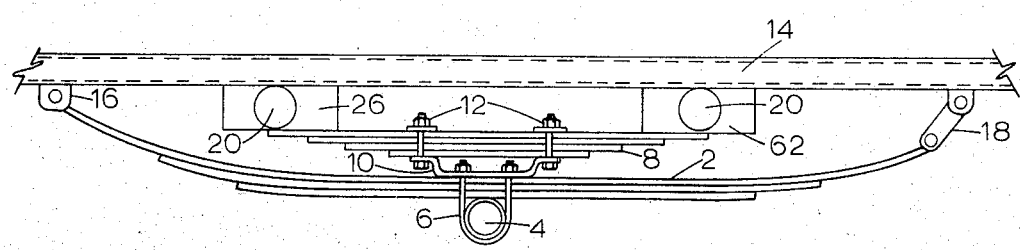
FIG. 2 is a side elevation view of the vehicle overload spring apparatus with a first first support means and a second first support means shown as circles.
Figure 3:
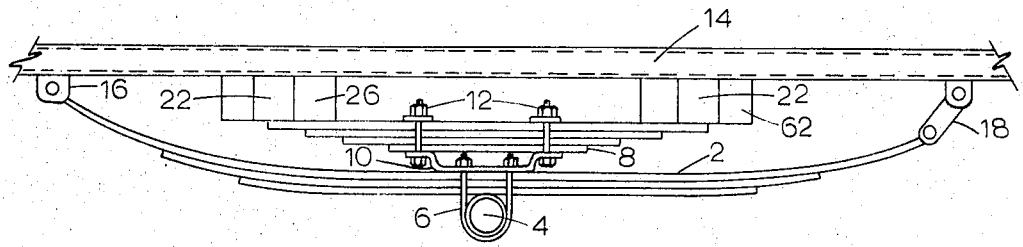
FIG. 3 is a side elevation view of the vehicle overload spring apparatus with the first second support means and second second support means shown as squares.

As shown in FIG. 1, FIG. 2, and FIG. 3 the vehicle overload spring apparatus can use either two first support means 20, or two second support means 22, or a first first support means 20 and a first second support means 22. It can also be seen that the first support means 20 and second support means 22 are selectively individually or simultaneously engagable with the overload spring 8. If a lesser increment of overload spring 8 support is required only one of the first support means 20 or second support means 22 is engaged with the overload spring 8.

This invention in its broader aspects is not limited to the specific manufacture shown and described, but departure may be made therefrom within the scope of the accompanying claims without departing from the principles of the invention and without sacrificing its chief advantages.

I claim:

1. Apparatus for selectively coupling a vehicle overload spring with the vehicle frame, said apparatus comprising:
    a. a rod adapted to be secured to the frame and projecting laterally therefrom;
    b. a compression member;
    c. pivoting means mounting the compression member on the rod for swinging movement into and out of a load bearing position extending between the rod and the overload spring, and for sliding movement longitudinally of the rod; and
    d. retaining means adapted to be secured to the frame in position for holding the compression member against swinging movement when the member is in a predetermined position longitudinally of the rod, whereby to permit selective installation and removal of the member from said load bearing position.

2. Apparatus as recited in claim 1 further comprising means for releasably holding the compression member against movement longitudinally of the rod.

3. An apparatus as set forth in claim 1 and including:
    a. a clamp on said compression member for engaging and clamping said compression member to the overload spring when said compression member is in spring engaging, load bearing position.

4. An apparatus as set forth in claim 2 and including:
    a. a second retaining means adapted to be secured to the frame in position for engaging the compression member when removed from load bearing position and for cooperating with said releasable holding means to retain said compression member removed from load bearing position.

5. A vehicle overload spring apparatus for a vehicle which comprises:
    a. a vehicle overload spring mounted to a vehicle unsprung member;
    b. a first support means and second support means mounted to a vehicle frame adjacent opposite ends of the overload spring for selectively, individually and simultaneously engaging or not engaging the overload spring, said second support means comprising:
1. a rod mounted to the frame;
2. a support pivotally and laterally slidably mounted on the rod for engaging the overload spring when in the spring engaging down position;
3. biasing means for urging said support against the frame;
4. a first stop and second stop mounted to the frame snugly adjacent and on opposite sides of said support for preventing forward or rearward movement of said support when in the spring engaging down position;
5. a holding member mounted to the frame for holding said support in the up position.

6. A vehicle overload spring apparatus for a vehicle as recited in claim 5 wherein the biasing means comprises:
   a. a retaining ring mounted to the end of the rod; and
   b. a biasing spring mounted on the rod between said support and retaining ring for urging said support against the vehicle frame.

7. A vehicle overload spring apparatus for a vehicle as recited in claim 5 further comprising:
   a. a clamp mounted to the lower end of said support for engaging and clamping said support to the overload spring when said support is in the spring engaging down position.

8. A vehicle overload spring apparatus for a vehicle as recited in claim 6 further comprising:
   a. a clamp mounted to the lower end of said support for engaging and clamping said support to the overload spring when said support is in the spring engaging down position.

9. A vehicle overload spring apparatus for a vehicle as recited in claim 7 further comprising:
   a. a handle mounted to said support for sliding said support laterally against the biasing means.

* * * * *